US006954180B1

(12) United States Patent
Braun et al.

(10) Patent No.: US 6,954,180 B1
(45) **Date of Patent: *Oct. 11, 2005**

(54) ANTENNA DEVICE FOR TRANSMITTING AND/OR RECEIVING RADIO FREQUENCY WAVES AND METHOD RELATED THERETO

(75) Inventors: Christian Braun, Stockholm (SE); Olov Edvardsson, Täby (SE); Leif Eriksson, Norrtälje (SE)

(73) Assignee: AMC Centurion AB, Akersberga (SE)

( * ) Notice: Subject to any disclaimer, the term of this patent is extended or adjusted under 35 U.S.C. 154(b) by 0 days.

This patent is subject to a terminal disclaimer.

(21) Appl. No.: 09/712,144

(22) Filed: Nov. 15, 2000

Related U.S. Application Data

(63) Continuation of application No. PCT/SE00/02059, filed on Oct. 24, 2000.

(30) Foreign Application Priority Data

Oct. 29, 1999 (SE) .................................... 9903945

(51) Int. Cl.[7] ............................ H01Q 1/24; H04B 7/10

(52) U.S. Cl. ................... 343/702; 343/876; 455/277.2; 455/575.7

(58) Field of Search ......................... 343/702, 700 MS, 343/900, 725, 876, 728; H01Q 1/24; 455/90, 455/575.7, 277.1, 277.2

(56) References Cited

U.S. PATENT DOCUMENTS

| | | | | |
|---|---|---|---|---|
| 3,693,088 A | | 9/1972 | Rustako, Jr. et al. | 455/506 |
| 4,123,759 A | | 10/1978 | Hines et al. | 343/876 |
| 4,958,382 A | | 9/1990 | Imanishi | 455/277.1 |
| 5,243,358 A | | 9/1993 | Sanford et al. | 343/836 |
| 5,294,939 A | * | 3/1994 | Sanford et al. | 343/836 |
| 5,463,406 A | | 10/1995 | Vannatta et al. | 343/725 |
| 5,471,146 A | | 11/1995 | Krayeski et al. | 324/637 |
| 5,486,836 A | * | 1/1996 | Kuffner et al. | 343/700 MS |
| 5,530,926 A | | 6/1996 | Rozanski | 455/277.2 |
| 5,541,614 A | | 7/1996 | Lam et al. | 343/792.5 |
| 5,589,844 A | | 12/1996 | Belcher et al. | 343/860 |
| 5,617,102 A | | 4/1997 | Prater | 342/374 |
| 5,680,142 A | | 10/1997 | Smith et al. | 342/372 |
| 5,689,439 A | | 11/1997 | Weerackody et al. | 370/329 |
| 5,710,995 A | | 1/1998 | Akaiwa et al. | 455/277.2 |
| 5,754,104 A | | 5/1998 | Saito | 340/539 |
| 5,777,581 A | | 7/1998 | Lilly et al. | 343/700 MS |
| 5,794,145 A | | 8/1998 | Milam | 455/426 |
| 5,920,809 A | | 7/1999 | Clarke | 455/272 |
| 5,933,122 A | | 8/1999 | Sauer et al. | 343/876 |
| 5,991,643 A | | 11/1999 | Chao-Cheng | 455/562 |
| 6,021,317 A | | 2/2000 | Irvin | 455/78 |
| 6,034,638 A | | 3/2000 | Thiel et al. | 343/702 |
| 6,046,697 A | | 4/2000 | Overbury et al. | 342/360 |

(Continued)

FOREIGN PATENT DOCUMENTS

| | | |
|---|---|---|
| EP | 0546803 | 6/1993 |

(Continued)

*Primary Examiner*—Michael C. Wimer
(74) *Attorney, Agent, or Firm*—Holland & Hart LLP

(57) ABSTRACT

An antenna device for transmitting and/or receiving electromagnetic radiation, installable in and connectable to a communication device, inlcudes an antenna structure switchable between a plurality of antenna configuration states. Each antenna configuration state is distinguished by a set of radiation parameters, such as resonance frequency, input impedance, bandwidth, radiation pattern, gain, polarization, and near-field pattern. Each of the plurality of antenna configuration states is adapted for use of the antenna device in the communication device in a respective predefined physical operation environment. A switching device selectively switches the antenna structure between the plurality of antenna configuration states.

25 Claims, 4 Drawing Sheets

U.S. PATENT DOCUMENTS

| | | | | |
|---|---|---|---|---|
| 6,118,409 | A | 9/2000 | Pietsch et al. | 343/703 |
| 6,297,780 | B1 | 10/2001 | Kirisawa | 343/703 |
| 6,370,369 | B1 | 4/2002 | Kraiem et al. | 455/277.1 |
| 6,392,610 | B1 * | 5/2002 | Braun et al. | 343/876 |

FOREIGN PATENT DOCUMENTS

| | | |
|---|---|---|
| EP | 0852407 | 8/1998 |
| EP | 0840394 | 6/1999 |
| GB | 2327572 | 1/1999 |
| GB | 2332124 | 9/1999 |
| JP | 10145130 | 5/1998 |
| JP | 10209932 | 7/1998 |
| WO | WO 94/28598 | 12/1994 |
| WO | WO 99/44307 | 9/1999 |

* cited by examiner

ANTENNA DEVICE FOR TRANSMITTING AND/OR RECEIVING RADIO FREQUENCY WAVES AND METHOD RELATED THERETO

CROSS REFERENCE TO RELATED APPLICATIONS

The present invention claims priority to commonly assigned Swedish Patent Application Serial No. 9903945-5 filed Oct. 29, 1999 and is a continuation of PCT Patent Application Serial No. PCT/SE00/02059 filed on Oct. 24, 2000, the entire contents of all of which are hereby incorporated by reference in their entirety for all purposes. The present application is also related to commonly assigned, co-pending U.S. patent application Ser. No. 09/712,131 entitled "An antenna device for transmitting and/or receiving RF waves", now U.S. Pat. No. 6,392,610; U.S. patent application Ser. No. 09/712,181 entitled "Antenna device and method for transmitting and receiving radio waves"; and U.S. patent application Ser. No. 09/712,133 entitled "Antenna device and method for transmitting and receiving radio frequency waves", all of which were filed concurrently herewith. These applications are based on the following corresponding PCT applications: PCT/SE00/02058; PCT/SE00/02056; and PCT/SE00/02057, respectively, all filed on Oct. 24, 2000, the entire contents of which are hereby incorporated by reference in their entirety for all purposes.

TECHNICAL FIELD OF THE INVENTION

The present invention relates generally to an antenna device, a radio communication device including the antenna device, and a method for transmitting and receiving electromagnetic waves. More particularly, the present invention is related to an antenna device that is adaptable to a variety of conditions.

BACKGROUND OF THE INVENTION

In modern communication systems, there is an ever-increasing demand for smaller and more versatile portable wireless terminals, e.g., hand-portable telephones. It is well known that the size of an antenna is a critical factor for its performance. Further, the interaction between the antenna, the telephone body and the close-by environment, such as the user, will become more important as the wireless terminals become smaller and smaller. It is thus a formidable task to manufacture such compact and versatile terminals, which exhibit good antenna performance under a variety of conditions.

In current manufacturing of hand-portable telephones, the antenna is commonly adapted to the characteristics of the specific telephone and to be suited for a default use in a default environment. This means that the antenna cannot later on be adapted to any specific condition under which a certain telephone is to be used.

The radiating properties of an antenna device for a portable telephone depends heavily on the shape and size of the support structure such as a printed circuit board (PCB) of the telephone and of the telephone casing. All radiation properties, such as resonance frequency, radiation pattern, polarization, impedance and bandwidth are a product of the antenna device itself and its interaction with the PCB and the telephone casing. Thus, all references to radiation properties made below are intended to be for the whole device in which the antenna is incorporated.

What has been stated above is true also with respect to other communication devices, such as cordless telephones, telemetry systems, wireless data terminals, etc. Thus, the antenna device of the invention is applicable on a broad scale in various communication devices.

SUMMARY OF THE INVENTION

The present invention is therefore directed to an antenna device, a communication device including the antenna device and a method of receiving and transmitting electromagnetic waves that substantially overcomes one or more of the problems due to the limitations and disadvantages noted above.

It is an object of the present invention is to provide a versatile antenna device, adaptable to various conditions, for a communication device. In this respect, it is a particular object of the invention to provide a versatile antenna device, which is adaptable to its close-by environment.

It is yet a further object of the invention to provide an antenna device of which certain characteristics, such as resonance frequency, input impedance bandwidth, radiation pattern, gain, is polarization, and near-field pattern, are easily controllable.

It is still a further object to provide an antenna device that is simple, lightweight, easy to manufacture and inexpensive.

It is yet a further object to provide an antenna device which is efficient, easy to install and reliable, particularly mechanically durable, even after long use.

It is still a further object of the invention to provide an antenna device suited to be used as an integrated part of a communication device.

These and other objects of the present invention will become more readily apparent from the detailed description given hereinafter. However, it should be understood that the detailed description and specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description of embodiments of the present invention given hereinbelow and the accompanying FIGS. 1–9, which are given by way of illustration only, and thus are not limitative of the invention.

DETAILED DESCRIPTION OF PREFERRED EMBODIMENTS

Figure 1:
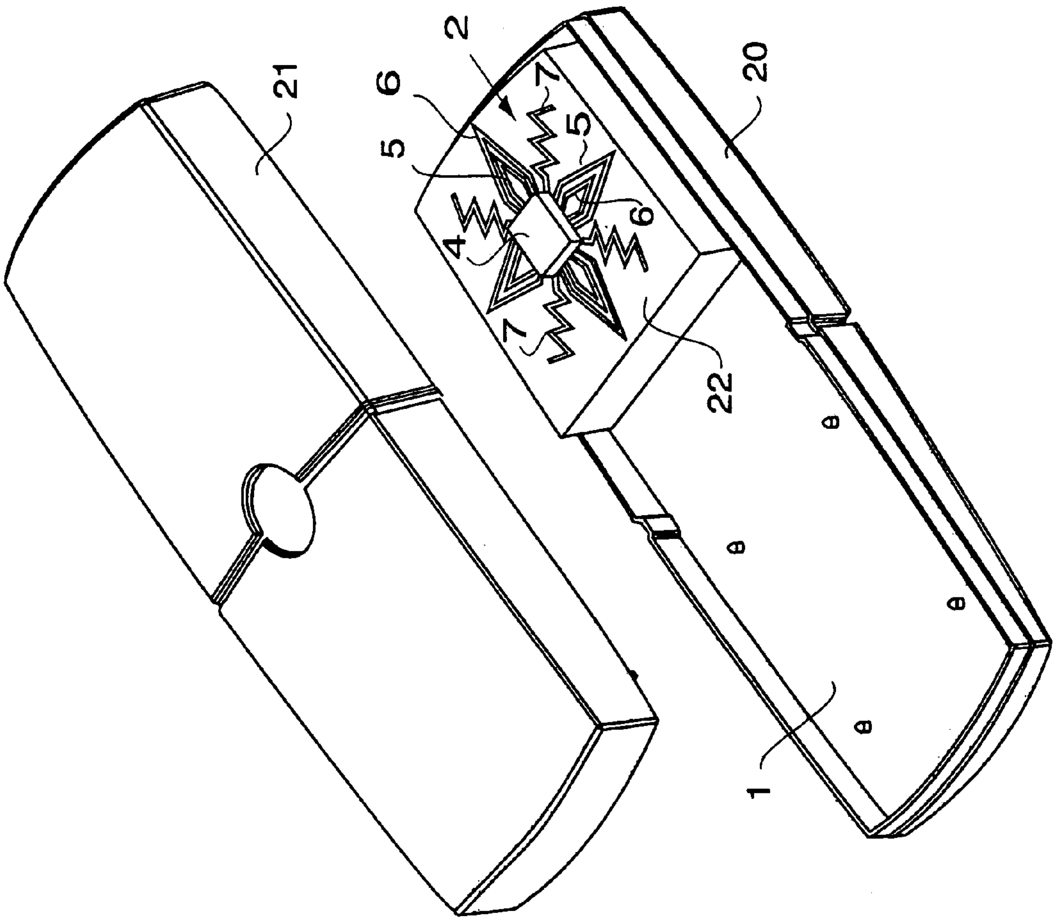
FIG. 1 is a perspective view of two casing parts of a portable telephone including one embodiment of an antenna device according to the present invention.

In the following description, for purposes of explanation and not limitation, specific details are set fourth in order to provide a thorough understanding of the present invention. However, it will be apparent to one skilled in the art that the present invention may be practiced in other embodiments that depart from these specific details. In other instances, detailed descriptions of well-known devices and methods are omitted so as not to obscure the description of the present invention with unnecessary details.

In this disclosure it is to be understood that the antenna system of the invention is operable to transmit or receive electromagnetic signals. Even if a term is used herein that suggests one specific signal direction it is to be appreciated that such a situation can cover that signal direction and/or its reverse. The expression “antenna structure” is intended to include active elements connected to the transmission (feed) line(s) of the communication device circuitry, as well as elements that can be grounded or left disconnected, and hence operate as, e.g., directors, reflectors, impedance matching elements.

According to the present invention, there is provided an antenna device for transmitting and/or receiving RF radiation, which is installable in and connectable to a radio communication device. The antenna device includes an antenna structure, which is switchable between a plurality of antenna configuration states. Each antenna configuration is distinguished by a set of radiation parameters, such as resonance frequency, input impedance, bandwidth, radiation pattern, gain, polarization, and near-field pattern. The antenna device also includes a switching device for selectively switching the antenna structure between the plurality of antenna configuration states.

In the antenna device, each of the antenna configuration states is adapted for use of the antenna device in the radio communication device in a respective predefined physical operation environment. These predefined physical operation environments may include a talk position (TP), a free space position (FS), a waist position (WP) and a pocket position (PP). A predefined physical operation environment as used herein preferably means a close-by environment, which includes objects that affect the above-mentioned parameters of the antenna structure, particularly when being installed in a small-sized radio communication device. Close-by operation environment as used herein preferably means any object at a distance from the radio communication device within which the effect on the antenna parameters is noticeable. This distance may extend ten wavelengths from the device, but optionally it may extend five wavelengths, a few wavelengths, or only roughly about one wavelength from the device. The environment includes, of course, the user of the communication device.

Furthermore, the present invention includes various approaches for sensing the physical operation environment and various procedures for controlling the switching of the antenna device.

The description is hereinbelow divided into five main sections covering various aspects of the present invention. The first section gives an overview of a manifold of different antenna structures and switching devices that may be employed in the present invention. Thereafter, a description of different physical operation environments is given. A discussion about radiation related parameters that may be affected by the different operation environments follows, and which parameter changes may be compensated for by switching to another antenna configuration state. The discussion focuses primarily on the parameters resonance frequency, impedance and radiation pattern and two specific examples are briefly overviewed. Subsequently, some approaches for sensing the physical operation environment are depicted, and, finally some procedures for controlling the switching of the antenna device are outlined.

Antenna Structures and Switching Devices

In FIG. 1 a front part 20 and the back part 21 of the casing of a portable telephone are shown. The main printed circuit board (PCB) of the phone is to be mounted in the space 1 in the front part 20 of the casing. An antenna device 2 of the present invention is printed on a separate supporting device 22 in this embodiment. The support can be a flexible substrate, a Molded Interconnection Device (MID) or a PCB. However, the antenna could have been printed on the main PCB, as well, which can extend along the length of the bottom casing. There are RF feed lines and control lines for the switching device between the phone circuit on the PCB and the antenna device.

The antenna device 2 includes a switching device 4. The switching device 4 includes a matrix of electrically controllable switching elements. The switching elements can include microelectro-mechanical system switches (MEMS), PIN diode switches, or GaAs field effect transistors (FET).

The switching device 4 is surrounded by an antenna structure including a pattern of antenna elements. Each antenna element is connected to a respective switch in the switching device arranged for connecting and disconnecting the antenna element. In this embodiment, the radiating structure includes four loop-shaped antenna elements 5. A loop-shaped parasitic element 6 is formed within each of the loop-shaped antenna elements 5. A meander-shaped antenna element 7 is arranged between each pair of loop-shaped elements 5, 6. The antenna elements form a symmetrical pattern around the switching device 4. However, in certain applications the antenna elements can form an unsymmetrical pattern. Further, the radiation structure can include additional antenna elements not connected to the switching device.

The switching device 4 allows the antenna structure 2 to be selectively switchable between a number of antenna configuration states, each of which is distinguished by a set of radiation parameters, such as resonance frequency, input impedance, bandwidth, radiation pattern, gain, polarization and near-field pattern. The various antenna configuration states may be obtained by connecting loop-shaped antenna elements in parallel or in series with each other, or some elements can be connected in series and some in parallel. Further, one or more elements can be completely disconnected or connected to a RF ground plane. One or more of the meander-shaped antenna elements 7 can be used separately or in any combination with the loop antenna elements. The meander-shaped antenna elements 7 can also be segmented so that only one or more selected portions thereof can be connected if desired.

Although not illustrated in FIG. 1, other types of antenna elements, such as patch antennas, slot antennas, whip antennas, helical antennas, zigzag antennas and fractal antennas can also be used. In all cases, the switching device 4 may or may not be surrounded by the antenna elements and the antenna elements can also be positioned on one side of the switching device.

All switching of the antenna elements is centralized to the switching device 4, which can be very small with a controllable interaction with the antenna function. Further, as all switching is centralized to the switching device 4, switch control signals need only be supplied to the switching device 4, thereby simplifying the overall antenna structure, as well as providing other advantages.

The connection/disconnection of the antenna elements are easily controllable by the switching device 4. By appropriate selection of the combination of antenna elements that are connected to the RF feed, i.e., the antenna configuration state, the impedance and/or the resonance frequency of the antenna device can be adjusted without the need for separate connection or disconnection of discrete components. The same effect can be achieved by using parasitic elements, not connected to RF feed, but connected to RF ground or unconnected. The parasitic elements can also be connected to the switching device. If the to use of discrete components in any application is desired, these discrete components can be easily connected or disconnected by use of the same switching device 4 as the other antenna elements.

Further, the radiation pattern of the antenna can be shaped according to demand by appropriate selection of antenna elements. In this way the influence due to objects in the close-by environment of the antenna device, such as the user of a portable phone, can be minimized among other things. It will also be possible to control the tuning, polarization, bandwidth, resonance frequency, gain, input impedance of the antenna device. These above depicted radiation related parameters will be discussed in more detail further below.

Next, a few more antenna configurations will briefly be discussed with reference to FIGS. 2–6.

Figure 2:
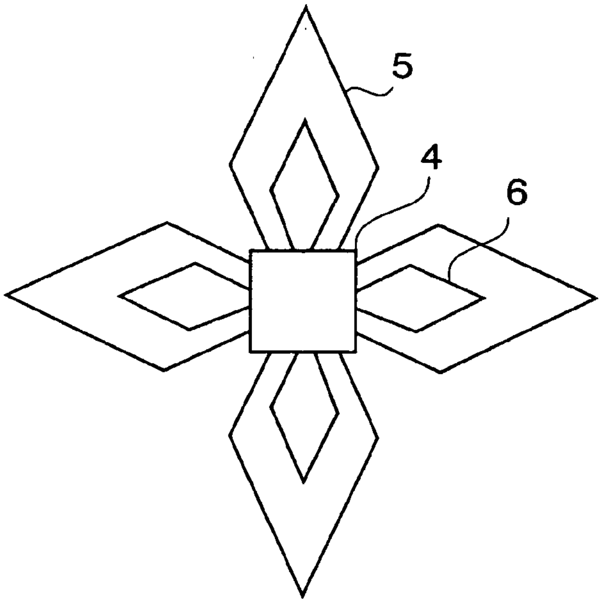
FIGS. 2–8 schematically illustrate additional embodiments of an antenna device according to the invention.

FIG. 2 is an example of an antenna device including a plurality of loop antenna elements 5, 6 as in FIG. 1. The loop antenna elements are arranged so that they start and end at the switching device 4. The switching device 4 can be used to connect the loop antenna elements to a RF feed line, short-circuited, coupled in series or in parallel with each other. Each loop antenna element can therefore be seen as a portion of the total antenna structure, from now on called "the total antenna", having properties determined by the state of the switching device 4. That is, the switching device 4 decides how the loop element portions are connected and electrically arranged. At least some of the loop antenna elements 5 can act as an actively radiating element, where the excitation is achieved through direct connection to a RF feed, preferably via a waveguide. Possibly, some of the loop antenna elements 6 can act as parasitic elements, where the excitation of the elements is achieved through parasitic coupling to other antenna elements.

The loop antenna elements can be shaped as three-dimensional structures. Parts or all of the structure can be positioned above the PCB. The pattern can go around, or through the PCB, so that part of the pattern is on the other side of the PCB. Some or all parts of the pattern can extend perpendicular to the PCB. There can be permanent shorting pins and/or components attached to the antenna elements outside of the switching device. The feeding of the antenna elements can also take place outside of the switching device.

The purpose of changing the antenna configuration state can be to match the antenna to a desired impedance. This can be done by switching in/out parasitic elements. The mutual coupling between the elements contributes to the input impedance of the active element, changing the resulting input impedance in a desired manner. Another purpose for altering the antenna configuration is to change the radiation pattern of the total antenna. This can be done by altering the connection of antenna portions so that the radiating currents are altered. This can also be done by switching in/out parasitic elements, thereby directing or reflecting the radiation towards a desired direction.

Figure 3:
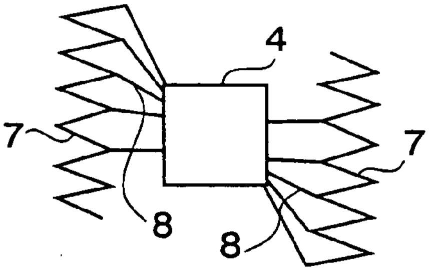

FIG. 3 shows an example of the antenna device where two meandering antenna elements 7 are connected to the central switching device 4. The expression "meandering" element is intended also to cover other elements with similar shape and function, such as zigzag shape, snake shape, fractal shape, etc. What has been stated above in connection with the loop antenna elements 5, 6 in FIG. 2 is applicable also regarding the meander shaped elements of FIG. 3, as is realized by the person skilled in this art. The only difference between the configurations is the inherent difference in radiation characteristics between these two types of antenna elements as is well known in the art.

In FIG. 3, connection lines 8, which provide the RF feed and/or RF ground points of the meander antenna element 7, can be switched between different positions along the meander antenna element 7. The aim of this can be to change the input impedance for matching purposes or to change the current flow for radiation pattern control.

Figure 4:
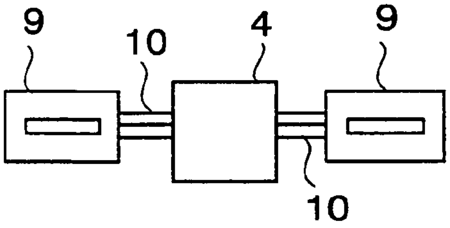

FIG. 4 shows an example of an antenna device where slot antenna elements 9 are connected to the central switching device 4. The slot antenna elements 9 are connected to the switching device 4 via connection lines 10. The connection lines 10 can be connected directly to a RF feed device, shorted, coupled in series or in parallel with lines to other antenna elements. Each connection line 10 can act as an active feed line and be connected directly to a RF feed device. Parasitic coupling, where there is no direct connection to any RF feed, can also be used.

At least one slot element 9 of the antenna device is fed by at least one connection line 10, and in various ways tuned by the other lines. For example, the other lines can be shorted or left open so that the slot antenna element 9, and, in effect, the whole antenna device, is tuned for a desired frequency band. The same technique can be used to change the radiation pattern of the wireless terminal, to which the antenna device is coupled, pattern shaping. Moreover, connecting, disconnecting or tuning other slot elements can provide tuning or pattern shaping.

Figure 5:
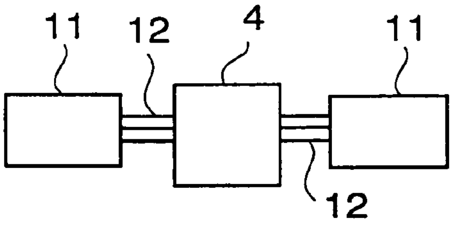

FIG. 5 shows an example of an antenna device similar to that of FIG. 4, but where two patch antenna elements 11 are connected to the central switching device 4 via connection lines 12. The patch antenna elements 11 are placed closed to or in connection to the central switching device. What has been stated above in connection with FIG. 4 is also relevant for the embodiment of FIG. 5.

Figure 6:
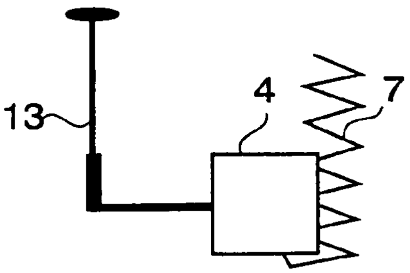

FIG. 6 shows an example of an antenna device where a meander element 7 is connected to the central switching device 4 together with a whip antenna element 13. The whip elements 13 and meander elements 7 can be connected directly to a RF feed device, shorted or coupled in parallel/series. Each element can act as an active radiating element, i.e., be connected directly to a RF feed device, or as a parasitic element, where there is no galvanic connection to a RF feed device. For example, the electrical length of the whip element 13 and/or the meander element 7 can be altered to tune the resonance frequency. There can be other parasitic elements, not shown, close to the whips and/or the meander for tuning and/or for changing the radiation pattern. In this way the radiation pattern can be mainly directed towards a desired direction. The whip element can be replaced by or combined with a helical antenna element.

Of course, the antenna device can include a switching device and any combination of the above described antenna elements forming a symmetrical or an unsymmetrical pattern of radiating elements. The antenna device can be adapted for operation in several frequency bands and for receiving and transmitting radiation of different polarization. In addition, the switching device 4 can be used to connect or disconnect discrete matching components. The invention is not limited to any specific shape of the individual antenna elements as the shapes can be chosen according to the desired function.

Close-by Operation Environments

Next, various physical operation environments that may affect the performance of the antenna device in accordance with the invention will be described. The antenna parameters, such as resonance frequency, input impedance, bandwidth, radiation pattern, gain, polarization, and near-field pattern, of a small-sized wireless communication device are affected by objects in the close-by environment of the device.

A small-sized wireless communication device, such as a mobile telephone, can be used in many different close-by environments. It can be held to the ear as a telephone, it can be put in a pocket (with the front toward the user or the back toward the user), it can be attached to a belt at the waist, or it can be held in the hand or placed on an electrically conductive surface. Many more operation environments may be enumerated. Common for all environments is that there may be objects in the close-by environment of the device, thereby affecting the antenna parameters of the device. Environments with different objects in the proximity of the device have different influence on the antenna parameters.

Two specific operation environments will in the following be specifically discussed.

The free space (FS) operation environment is obtained by locating the radio communication device in empty space, i.e. with no objects in the close-by environment of the device. Air surrounding the device is here considered to be free space. Many operation environments can be approximated by the free space environment. Generally, if the environment has little influence on the antenna parameters, it can be referred to as free space.

The talk position (TP) operation environment is defined as the position, in which the radio communication device is held to the ear by a user. The influence on the antenna parameters varies depending on the person holding the device and on exactly how the device is positioned. Here, the TP environment is considered as a general case, i.e. covering all individual variations mentioned above.

Radiation Related Parameters

Various radiation related parameters that may be affected by the physical operation environment and controlled by an antenna device in accordance with the invention will now be described in more detail.

Antennas for wireless communication devices experience detuning due to the presence of the user. For many antenna types, the resonance frequency drops considerably when the user is present, compared to when the device is positioned in free space. An adaptive tuning between free space and talk position can reduce this problem largely.

A straightforward manner to tune an antenna is to alter its electrical length, and thereby altering the resonance frequency. The longer the electrical length, the lower the resonance frequency. This is also the most straightforward way to create band switching, if the change in electrical length is large enough.

Figure 7:
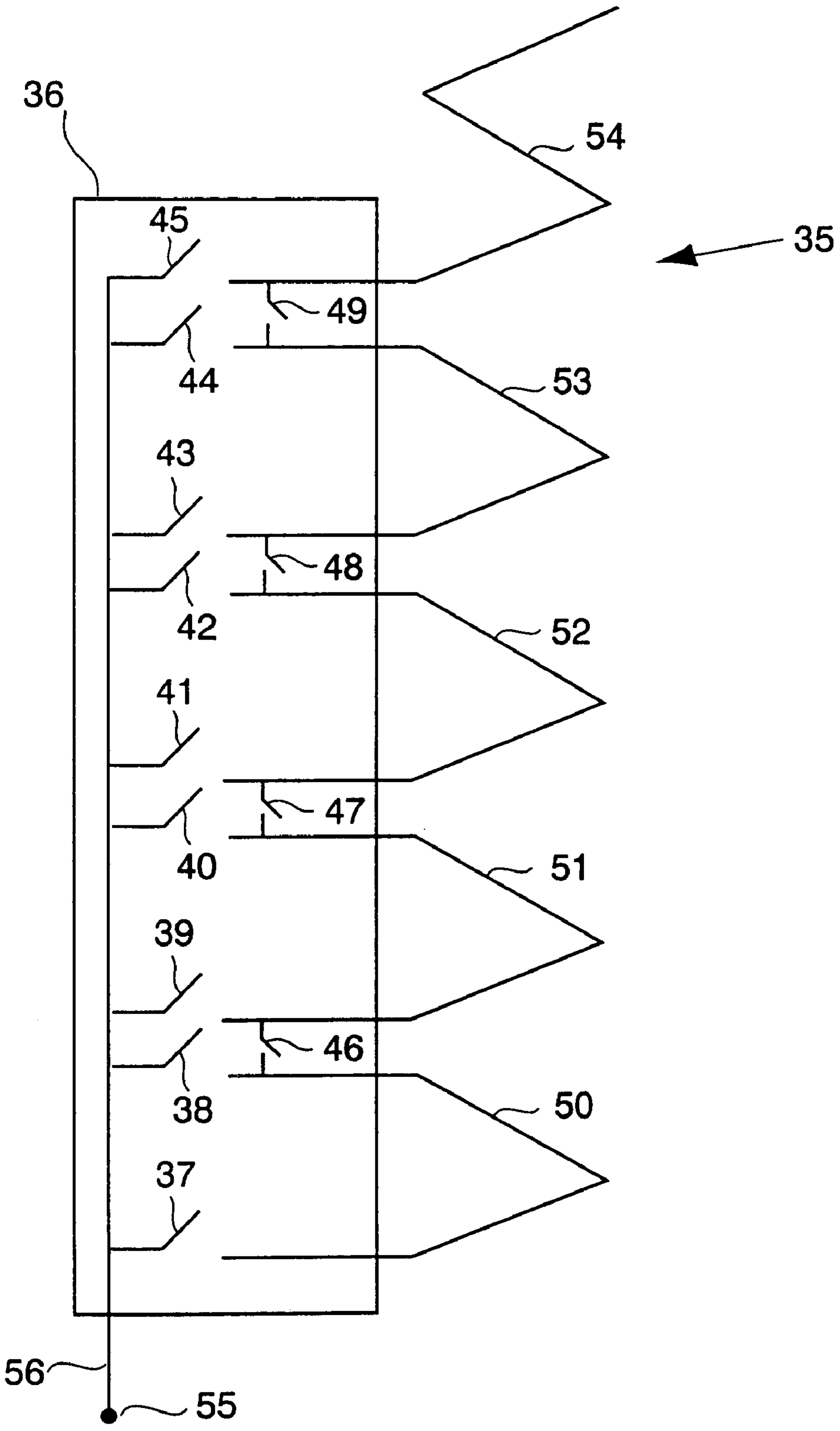

FIG. 7 shows a meander-like antenna structure 35 arranged together with a central switching device 36 including a plurality of switches 37–49. The antenna structure 35 may be seen as a plurality of aligned and individually connectable antenna elements 50–54, which are connectable to a feed point 55 through the switching device 36 and a feed line 56. Feed point 55 is further connected to a low noise amplifier of a receiver circuitry (not shown) of a communication device, and hence, the antenna structure 35 operates as a receiving antenna. Alternatively, the feed point 55 is connected to a power amplifier of a communication transmitter for receiving an RF power signal, and hence the antenna structure 35 operates as a transmitting antenna. Optionally, the antenna structure 35 may be arranged for both transmission and reception.

A typical example of operation is as follows. Assume that switches 37 and 46–49 are closed and remaining switches are opened and that such an antenna configuration state is adapted for optimal performance when the antenna device is arranged in a hand-portable telephone located in free space. When the telephone is moved to talk position, the resonance frequency will be lowered due to the user and thus, in order to compensate for the presence of the user, switch 49 is opened, whereby the electrical length of the connected antenna structure is reduced and accordingly the resonance frequency is increased. This increase, with an appropriate design of antenna structure 35 and switching device 36, will compensate for the reduction as introduced when the telephone is moved from free space to talk position.

According to the invention, all switching of the antenna elements 50–54 required for different purposes is centralized to the switching device 36 which is provided with a single feed line. Instead of tuning a detuned antenna, one can perform adaptive impedance matching, which involves letting the resonance frequency be slightly shifted and compensate this detuning by impedance matching.

An antenna structure can be fed at different locations. Each location has a different ratio between the E and H fields, resulting in different input impedances. This phenomenon can be exploited by switching the feed point, provided that the feed point switching has little influence on the resonance frequency of the antenna. When the antenna experiences detuning due to the presence of the user (or other object), the antenna can be matched to the feed line impedance by altering for example the feed point of the antenna structure. In a similar manner, RF ground points can be altered.

Figure 8:
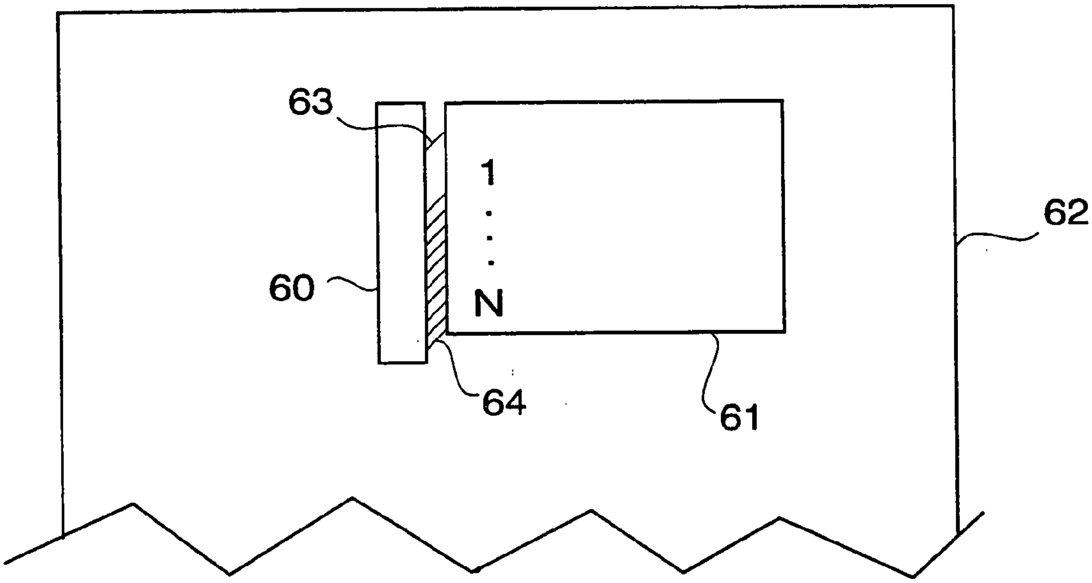

In FIG. 8 is schematically shown an example of such an implementation of an antenna structure 61 that can be selectively RF grounded at a number of different points spaced apart from each other. Antenna structure 61 is in the illustrated case a planar inverted F antenna (PIFA) mounted on a printed circuit board 62 of a radio communication device. Antenna 61 has a feed line 63 and N different spaced RF ground connections 64. By switching from one RF ground connection to another, the impedance is slightly altered. As before all switching functions are centralized to a central switching device 60.

Moreover, switching in/out parasitic antenna elements can produce an impedance matching, since the mutual coupling from the parasitic antenna element to the active antenna element produces a mutual impedance, which contributes to the input impedance of the active antenna element. If outer limits for the detuning of the antenna elements can be found, the range of adaptive tuning/matching that needs to be covered by the antenna device can be estimated.

The radiation pattern of a wireless terminal is affected by the presence of a user or other object in its near-field area. Loss-introducing material will not only alter the radiation pattern, but also introduce loss in radiated power due to absorption. This problem can be reduced if the radiation pattern of the terminal is adaptively controlled. The near-field radiation pattern can be directed mainly away from the loss-introducing object, which will reduce the overall losses.

A change in radiation pattern requires the currents producing the electromagnetic radiation to be altered. Generally, for a small device (e.g. a hand-portable telephone), there need to be quite large changes in the antenna structure to produce altered currents, especially for the lower frequency bands. However, this can be done by switching to another antenna type producing different radiation pattern, or to another antenna structure at another position/side of the PCB of the communication device.

Another way may be to switch from an antenna structure that interacts heavily with the PCB of the communication device (e.g., whip or patch antenna) to another antenna not doing so (e.g., loop antenna). This will change the radiating currents dramatically since interaction with the PCB introduces large currents on the PCB (the PCB is used as a main radiating structure).

Sensing of the Physical Operation Environment

According to the present invention, a sensor may be provided for detecting a physical property of a selected close-by environment and a control device may be provided for controlling the switching device, and thus the selective switching of the antenna structure between the various antenna configuration states, in dependence on the detected physical property. The sensor would in the general case not be part of the antenna device, but be located at the surface of the wireless terminal casing. In such an instance, the response of the sensor is received at the antenna module control device.

The sensing of the close-by environment can be performed in several manners. One manner can be to use sensors on different positions at the device. In this manner, objects on different sides of the device may be sensed. The sensors can be of different kinds, e.g., resistive, capacitive or inductive sensors.

Capacitive (negative reactance) or inductive (positive reactance) sensors change their reactance when objects with electrical properties differing from those of free space are close to them. Hence, these sensors may distinguish objects that do not have a large effect on the electric performance of the antenna, e.g. cloth. Capacitive sensors are in general more sensitive to dielectric materials. Capacitive sensors can be found in, e.g., elevator buttons. Inductive sensors, on the other hand, are in general more sensitive to conducting materials. Inductive sensors are often used in the automation industry, for sensing end points of metallic goods.

Another sensor type may be a heat detector for sensing body heat. Optical sensors, e.g., photo detectors, can also be used to detect objects in the close-by environment. Still other sensors that may be employed include pressure, inclination, orientation, or motion sensors, which may detect motion patterns and from them deduce different usage scenarios. Pressure sensors may detect whether the communication device is held by a person and the manner in which it is held.

Also, a measure of the reflection coefficient as measured after the power amplifier of the transmitter can be used to "sense" objects, which cause detuning of the antenna. This is possible since objects with electrical properties, which in the near-field area, i.e., close-by environment, of the antenna differ from those of free space, will influence the antenna-input impedance.

Yet another manner, in which the environment the device is in, may be determined, is the usage state itself, i.e., if the device is used for speech, and no hands-free unit is in use, the antenna is optimized for talk position.

Procedures for Controlling the Switching

The invention will be exemplified below by an algorithm, which uses any suitable sensed parameter such as the reflection coefficient as an optimization parameter. In the following example, the voltage standing wave VSWR is used.

Figure 9:
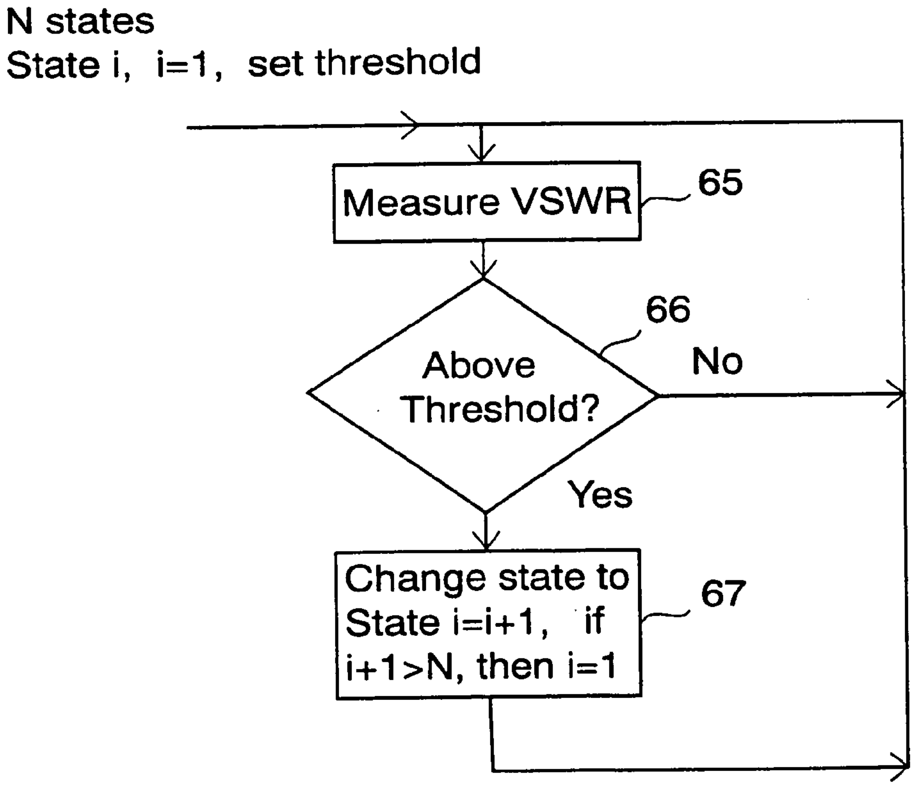
FIG. 9 is a flow diagram of an example of a switch-and-stay algorithm for controlling a switching device of an inventive antenna device.

A simple and easily implemented algorithm is a switch-and-stay algorithm, which is shown in the flow diagram of FIG. 9. Here switching is performed between predefined states i=1, . . . , N (e.g. N=2, one state being optimized for FS and the other state being optimized for TP). A state i=1 is initially chosen, whereafter, in a step 65, the VSWR is measured. The measured VSWR is then, in a step 66, compared with a predefined limit (the threshold value). If this threshold is not exceeded the algorithm is returned to step 65. If this threshold is exceeded, the algorithm proceeds to step 67, whereby switching to a new state i=i+1 is performed. If i+1 exceeds N, switching is performed to state 1. After this step, the algorithm returns to step 65.

Using such an algorithm, each state 1, . . . , N is used until the detected VSWR exceeds the predefined limit. When this occurs, the algorithm steps through the predefined states until a state is reached which has a VSWR below threshold. Both transmitter and receiver antenna structures can be switched at the same time.

Next, the invention will be exemplified by a procedure using a look-up table for determining which antenna configuration state to switch to.

The sensor senses the close-by environment of the radio communication device. Different type of sensors will give different images of the close-by environment. For example, if capacitive or inductive sensors are used at various locations on the device, one may be able to tell towards which direction (as seen from the device) there is least influence from close-by objects. The antenna configuration state is then chosen so as to direct the main radiation towards this direction.

To each set of responses from the sensor(s), there is an associated antenna configuration state that preferably minimizes the influence of the objects, minimizing loss and maximizing radiated power. This can be implemented in the form of a look-up table.

A trial-and-error algorithm works only if an antenna related parameter is measured, for example the reflection coefficient. All sensors not sensing specific antenna parameters could use for example a look-up table type of procedure as described above. Of course, combinations can be used. One example of this is that non-antenna-related parameter sensors are used in order to find the antenna configuration state that works in the best manner possible. A trial-and-error algorithm may optionally fine-tune the antenna configuration state afterwards.

It will be obvious that the invention may be varied in a plurality of ways. Such variations are not to be regarded as a departure from the scope of the invention. All such modifications as would be obvious to one skilled in the art are intended to be included within the scope of the appended claims.

What is claimed is:

1. An antenna device provided for transmitting and/or receiving RF radiation, installable in and connectable to a portable radio communication terminal device, and comprising:

an antenna structure comprising a plurality of antenna elements capable of being connected to and disconnected from each other, said antenna structure being switchable between a plurality of predefined antenna configuration states, in each of which multiple ones of said plurality of antenna elements are connected to each other, and each of which being distinguished by a set of radiation parameters; and a switching device provided for selectively switching said antenna structure between said plurality of predefined antenna configuration states, wherein each of said plurality of predefined antenna configuration states is optimized for operation of the antenna device in said portable radio communication terminal device in a respective predefined physical operation environment external to said portable radio communication terminal device, wherein said plurality of predefined antenna configuration states includes at least three antenna-configuration states, and said switching device is provided for receiving a measure indicating a change from a first one to a second one of said predefined physical operation environments and for switching said antenna structure from a first one to a second one of said plurality of predefined antenna configuration states, in dependence on said received measure, wherein said first predefined antenna configuration state is optimized for use of said antenna device in said portable radio communication terminal device in said first predefined physical operation environment, and said second predetermined antenna configuration state is optimized for use of said antenna device in said portable radio communication terminal device in said second predefined physical operation environment.

2. The antenna device of claim 1, wherein said plurality of antenna elements includes at least three antenna elements.

3. The antenna device of claim 1, wherein said plurality of antenna elements includes at least five antenna elements.

4. The antenna device of claim 1, wherein said plurality of predefined antenna configuration states includes at least five antenna configuration states.

5. The antenna device of claim 1, wherein at least some of said plurality of predefined antenna configuration states are optimized for operation of the antenna device in said portable radio communication terminal device in different frequency bands.

6. The antenna device of claim 1, wherein said antenna structure in at least some of said plurality of predefined antenna configuration states have different electrical lengths.

7. The antenna device of claim 1, wherein said switching device comprises a plurality of switches for connecting and disconnecting said plurality of antenna elements, and wherein said plurality of antenna elements are arranged one after another.

8. The antenna device of claim 1, wherein said antenna structure in at least some of said plurality of predefined antenna configuration states have different feed positions and/or different ground positions.

9. The antenna device of claim 8, wherein said at least some of said plurality of predefined antenna configuration states are identical except for the different feed positions and/or different ground positions.

10. The antenna device of claim 9, wherein said antenna structure comprises a planar or patch antenna and a plurality of feed connectors and/or ground connectors.

11. The antenna device of claim 1, wherein said antenna structure comprises two separate antennas of different type.

12. The antenna device of claim 11, wherein said two separate antennas are a whip antenna or a patch antenna, and a loop antenna or a meander antenna.

13. The antenna device as claimed in claim 1, wherein said switching device comprises a micro electromechanical system (MEMS) switch device.

14. The antenna device of claim 1, wherein each of said respective predefined physical operation environments is defined by objects affecting RF radiation and located within a distance from said portable radio communication terminal device of less than ten wavelengths of said RF radiation.

15. The antenna device of claim 1, wherein one of said plurality of predefined antenna configuration states is optimized for use of said antenna device in said portable radio communication terminal device in a position held to an ear of a user as a telephone, and one of said plurality of predefined antenna configuration states is optimized for use of said antenna device in said portable radio communication terminal device in a position held at a waist of the user.

16. The antenna device of claim 1, wherein said switching device is connectable to a sensor device, which is capable of sensing and identifying each of said respective predefined physical operation environments external to said portable radio communication terminal device, and which is provided for sending said measure indicating a change from a first one to a second one of said predefined physical operation environments to said switching device.

17. The antenna device of claim 16, wherein said antenna device comprises said sensor device.

18. The antenna device of claim 16, wherein said sensor device is capable of sensing and identifying each of said respective predefined physical operation environments external to said portable radio communication terminal device by means of sensing resistance, capacitance, inductance, light, temperature, and/or pressure external to said portable radio communication terminal device, or inclination, orientation and/or motion of said portable radio communication terminal device.

19. The antenna device of claim 16, wherein said sensor device is capable of sensing objects at two opposite sides of said portable radio communication terminal device simultaneously.

20. The antenna device of claim 1, wherein said antenna device is further provided with an adaptive fine-tuning device capable of controlling switching by said switching device to find an optimum one of a plurality of fine-tuning antenna configuration states, where said plurality of fine-tuning antenna configuration states are variants of said second predefined antenna configuration state.

21. An antenna device provided for transmitting and/or receiving RF radiation, installable in and connectable to a portable radio communication terminal device, and comprising:

an antenna structure comprising a plurality of antenna elements capable of being connected to and disconnected from each other, said antenna structure being switchable between at least three predefined antenna configuration states, each of which being distinguished by a set of radiation parameters, and each of which being associated with a different operation environment external to said portable radio communication terminal device;

a switching device capable of selectively switching said antenna structure between said at least three predefined antenna configuration states; and a control device provided for receiving a sensed resistance, capacitance, inductance, light, temperature, and/or pressure value external to said portable radio communication terminal device, for determining one of said different operation environments external to said portable radio communication terminal device depending on said sensed resistance, capacitance, inductance, light, temperature, and/or pressure value, and for controlling said switching device to switch said antenna structure to said one of said different operation environments determined depending on said sensed resistance, capacitance, inductance, light, temperature, and/or pressure value.

22. An antenna device provided for transmitting and/or receiving RF radiation, installable in and connectable to a portable radio communication terminal device, and comprising:

an antenna structure comprising a plurality of antenna elements capable of being connected to and disconnected from each other, said antenna structure being switchable between at least three predefined antenna configuration states, each of which being distinguished by a set of radiation parameters, and each of which being associated with a different operation environment external to said portable radio communication terminal device;

a switching device capable of selectively switching said antenna structure between said at least three predefined antenna configuration states; and a control device provided for receiving a measure of inclination, orientation and/or motion of said portable radio communication terminal device, for determining one of said different operation environments external to said portable radio communication terminal device depending on said measure of inclination, orientation and/or motion of said portable radio communication terminal device, and for controlling said switching device to switch said antenna structure to said one of said different operation environments determined depending on said measure of inclination, orientation and/or motion of said portable radio communication terminal device.

23. In an antenna device installable in and connectable to a portable radio communication terminal device, and comprising an antenna structure comprising a plurality of antenna elements capable of being connected to and disconnected from each other, said antenna structure being switchable between at least three predefined antenna configuration states, each of which being distinguished by a set of radiation parameters, and each of which being associated with a different operation environment external to said portable radio communication terminal device, a method for transmitting and/or receiving RF radiation comprising:

receiving a detected physical property external of said portable radio communication terminal device;

determining one of said different operation environments external to said portable radio communication terminal device depending on said detected physical property;

controlling switching of said antenna structure to said one of said different operation environments determined depending on said detected physical property; and transmitting and/or receiving RF radiation.

24. In an antenna device installable in and connectable to a portable radio communication terminal device, and comprising an antenna structure comprising a plurality of antenna elements capable of being connected to and disconnected from each other, said antenna structure being switchable between at least three predefined antenna configuration states, each of which being distinguished by a set of radiation parameters, and each of which being associated with a different operation environment external to said portable radio communication terminal device, a method for transmitting and/or receiving RF radiation comprising:

receiving a sensed resistance, capacitance, inductance, light, temperature, and/or pressure value external of said portable radio communication terminal device;

determining one of said different operation environments external to said portable radio communication terminal device depending on said sensed resistance, capacitance, inductance, light, temperature, and/or pressure value;

controlling switching of said antenna structure to said one of said different operation environments determined depending on said sensed resistance, capacitance, inductance, light, temperature, and/or pressure value; and transmitting and/or receiving RF radiation.

25. In an antenna device installable in and connectable to a portable radio communication terminal device, and comprising an antenna structure comprising a plurality of antenna elements capable of being connected to and disconnected from each other, said antenna structure being switchable between at least three predefined antenna configuration states, each of which being distinguished by a set of radiation parameters, and each of which being associated with a different operation environment external to said portable radio communication terminal device, a method for transmitting and/or receiving RF radiation comprising:

receiving a measure of inclination, orientation and/or motion of said portable radio communication terminal device;

determining one of said different operation environments external of said portable radio communication terminal device depending on said measure of inclination, orientation and/or motion of said portable radio communication terminal device;

controlling switching of said antenna structure to said one of said different operation environments determined depending on said measure of inclination, orientation and/or motion of said portable radio communication terminal device; and transmitting and/or receiving RF radiation.

* * * * *